(12) United States Patent
Verschoor

(10) Patent No.: US 6,880,500 B2
(45) Date of Patent: Apr. 19, 2005

(54) INTERNAL COMBUSTION ENGINE SYSTEM

(75) Inventor: Martin L. Verschoor, Rolling Hills Estates, CA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/678,567

(22) Filed: Oct. 3, 2003

(65) Prior Publication Data

US 2004/0065309 A1 Apr. 8, 2004

Related U.S. Application Data

(60) Provisional application No. 60/416,054, filed on Oct. 4, 2002, and provisional application No. 60/416,169, filed on Oct. 4, 2002.

(51) Int. Cl.[7] ............................................... F02M 25/07
(52) U.S. Cl. ................................ 123/58.8; 123/568.13; 60/605.2
(58) Field of Search ........................ 123/568.11, 568.12, 123/568.13, 568.15, 58.8; 60/605.2, 600, 602, 614, 620

(56) References Cited

U.S. PATENT DOCUMENTS

| 1,530,864 A | * | 3/1925 | Vaughan | ................ | 123/568.13 |
| 2,041,708 A | * | 5/1936 | Harper, Jr. | ............. | 123/568.13 |
| 3,702,111 A | | 11/1972 | Weaving et al. | | |

(Continued)

FOREIGN PATENT DOCUMENTS

| DE | 3903474 | 9/1989 |
| DE | 4414849 | 11/1995 |
| DE | 19541176 | 5/1997 |
| EP | 0426320 | 5/1991 |
| EP | 0953744 | 11/1999 |
| FR | 2564141 | 11/1985 |
| FR | 2784419 | 4/2000 |
| FR | 2799797 | 4/2001 |
| GB | 372556 | 5/1932 |
| GB | 1491231 | 11/1977 |
| GB | 2038936 | 7/1980 |
| GB | 2350400 | 11/2000 |

(Continued)

*Primary Examiner*—Willis R. Wolfe, Jr.
(74) *Attorney, Agent, or Firm*—Ephraim Starr; Chris James

(57) ABSTRACT

Cylinders of an internal combustion engine are provided with an exhaust port that is opened when the piston approaches bottom dead center. Exhaust in the cylinder at the end of the power stroke flows to an EGR tank for containment and cooling. During the intake stroke as the piston approaches bottom dead center, the exhaust port is reopened allowing gas from the EGR tank to flow into the cylinder as a portion of the charge prior to compression. Alternatively, the exhaust port on a first cylinder is connected to the exhaust port on a second cylinder to allow exhaust gas from the power stroke on the first cylinder to flow into the intake stroke on the second cylinder. Pulsed turbocharger systems comprise an internal combustion engine comprising a piston cylinder and a piston slidably disposed within the cylinder. The cylinder includes an exhaust gas port that is disposed through a wall section of the cylinder. The exhaust gas port is positioned near a bottom portion of the cylinder such that: (1) an opening of the port is exposed when the piston is at the bottom of its stroke within the cylinder; and (2) an opening of the port is covered when the piston is moved towards the top of its stroke. A turbocharger that is connected to the engine and comprises a turbine wheel that is in exhaust gas flow communication with the exhaust gas port. Pulsed exhaust gas exits the piston cylinder through the exhaust port, when the piston is near a bottom portion of its work stroke. This pulsed exhaust gas is directed to the turbine wheel to cause the turbocharger to produce boost air for directing to the engine.

13 Claims, 3 Drawing Sheets

U.S. PATENT DOCUMENTS

| | | | |
|---|---|---|---|
| 3,785,335 A | | 1/1974 | Toepel |
| 3,799,130 A | * | 3/1974 | Dahlsrtom ............. 123/568.13 |
| 4,109,625 A | | 8/1978 | Kawamura et al. |
| 4,237,826 A | | 12/1980 | Motosugi et al. |
| 4,282,845 A | | 8/1981 | Nohira et al. |
| 4,318,373 A | * | 3/1982 | Soubis ................. 123/568.13 |
| 4,535,593 A | | 8/1985 | Zinsmeyer |
| 4,630,446 A | | 12/1986 | Iwai et al. |
| 4,677,826 A | | 7/1987 | Iwai et al. |
| 4,829,958 A | * | 5/1989 | Duret ................... 123/568.13 |
| 4,864,979 A | | 9/1989 | Eickman |
| 5,628,295 A | * | 5/1997 | Todero et al. ......... 123/568.13 |
| 5,775,105 A | | 7/1998 | Zinsmeyer |
| 6,178,933 B1 | | 1/2001 | Lavy |
| 6,182,449 B1 | | 2/2001 | Halimi et al. |
| 6,308,666 B1 | | 10/2001 | Drecq |
| 6,427,644 B1 | | 8/2002 | Dabadie et al. |

FOREIGN PATENT DOCUMENTS

| | | | | |
|---|---|---|---|---|
| JP | 4255527 | | 9/1992 | |
| JP | 4-353220 A | * | 12/1992 | ................. 60/614 |
| JP | 6-307294 A | * | 11/1994 | ........ 123/FOR 124 |
| JP | 2921143 | | 11/1999 | |
| WO | WO 9428300 | | 12/1994 | |
| WO | WO 9934108 | | 7/1999 | |

* cited by examiner

INTERNAL COMBUSTION ENGINE SYSTEM

RELATED APPLICATIONS

This application claims priority of U.S. Provisional Patent applications Nos. 60/416,054 and 60/416,169, both filed on Oct. 4, 2002.

FIELD OF THE INVENTION

This invention relates generally to the field of gasoline and diesel-powered internal combustion engine exhaust gas recirculation (EGR) systems for emission improvement and, more particularly, to an EGR gas system that receives, stores, and transmits exhaust gas directly through a port in a piston cylinder. This invention relates generally to the field of turbocharged gasoline and diesel-powered internal combustion engines and, more particularly, to a pulse only turbocharger system

BACKGROUND OF THE INVENTION

EGR is a known method for reducing $NO_x$ emissions in internal combustion engines. A conventional EGR system works by taking a by-pass stream of engine exhaust gas from an engine exhaust manifold and pressurizing the exhaust gas a desired amount for injection into the engine's induction system, mixing with the intake air and combustion fuel mixture, and for subsequent combustion. A control valve is used within the EGR system to regulate the amount of exhaust gas that is routed to the engine induction system based on engine demand. The process of recirculating the exhaust gas insures that partially oxidized $NO_x$ become fully oxidized, thereby reducing smog producing partially-oxidized $NO_x$ emissions. Accordingly, such a conventional EGR system typically comprises exhaust by-pass tubing, related plumbing and manifolding, an engine crankshaft-driven EGR pump, and an EGR control valve, all of which are ancillary components that are attached to the engine.

A disadvantage of such conventional EGR systems is that they require the use of ancillary moving components, e.g., a pump and control valve, that are capable of failing or otherwise not performing properly, thereby interfering with the effective reduction of $NO_x$. Additionally, these components must be attached externally the engine, thereby occupying space within an engine compartment.

It is, therefore, desirable that an EGR system be constructed that does not depend on the use of such external and ancillary moving parts. It is also desirable that such EGR system provide a level of $NO_x$ reduction that is equal to or better than that provided by conventional EGR systems.

Turbochargers for gasoline and diesel internal combustion engines are known devices used in the art for pressurizing or boosting the intake air stream, routed to a combustion chamber of the engine, by using the heat and volumetric flow of exhaust gas exiting the engine. Specifically, the exhaust gas exiting the engine is routed via an exhaust manifold or exhaust pipe into a turbine housing of a turbocharger in a manner that causes an exhaust gas-driven turbine to spin within the housing.

The exhaust gas routed to such turbocharger is a by-pass stream taken from the combined exhaust stream generated by the engine, e.g., from an exhaust manifold or exhaust pipe that combines the different exhaust gas streams leaving each engine cylinder. Accordingly, the exhaust gas routed to such a turbocharger passes to the turbocharger at a substantially unpulsed or continuous volumetric flow rate. Of course the amount of exhaust gas flow routed to the turbocharger will increase with increasing engine speed or rpm. The exhaust gas-driven turbine is mounted onto one end of a shaft that is common to a radial air compressor mounted onto an opposite end of the shaft. Thus, rotary action of the turbine also causes the air compressor to spin within a compressor housing of the turbocharger that is separate from the exhaust housing. The spinning action of the air compressor causes intake air to enter the compressor housing and be pressurized or boosted a desired amount before it is mixed with fuel and combusted within the engine combustion chamber.

The amount by which the intake air is boosted or pressurized is controlled by regulating the amount of exhaust gas that is passed through the turbine housing by a wastegate valve. The wastegate valve is actuated, during turbocharger operation when the boost pressure is approaching a maximum desired pressure, to divert an amount of exhaust gas away from the turbocharger turbine housing to reduce the rotational speed of the turbine and, thereby reduce both the rotational speed of the air compressor and the amount by which the intake air is pressurized.

The above-described conventional turbocharger system is driven by a substantially continuous pressure exhaust by-pass stream from the engine exhaust. In such a system, the backpressure of the turbocharger can cause the exhaust pressure within the upstream exhaust system to be increased, ultimately robbing pumping energy from the engine crankshaft. Thus, although such a turbocharger functions to increase the boost pressure and combustion energy within the engine, it does so at a cost of increased backpressure.

It is, therefore, desirable that a turbocharger system be constructed that provides increased intake air boost pressure without significantly increasing the exhaust backpressure within the engine. It is also desired that such turbocharger system be capable of maintaining a positive pressure difference across an engine cylinder head at all operating points to both provide improved engine output and improved overall pumping efficiency.

SUMMARY OF THE INVENTION

Exhaust gas recirculation systems of this invention are used with internal combustion engines that have a number of piston cylinders with pistons slidably disposed within each cylinder. One or more piston cylinder comprises an exhaust gas port that is disposed through a wall portion of the cylinder, and that is positioned within the cylinder at a location near a bottom portion of the cylinder. Positioned in this manner, the port is exposed when the piston within the cylinder is at the bottom of its stroke (e.g., at bottom dead center). The port is covered when the piston moves upwardly within the cylinder towards the top of its stroke.

The system includes means for accommodating a volume of exhaust gas that is routed from the piston cylinder exhaust gas port when the piston within the cylinder is at the bottom of a work stroke. The means for accommodating is external from the engine. The exhaust gas captured by the means is reintroduced back through the exhaust gas port and into the cylinder when the piston is at the bottom of its compression stroke. Configured in this manner, the reintroduced exhaust gas operates to both improve engine combustion efficiency and engine performance.

The system can be configured to collect exhaust gas and reintroduce the same into the same piston cylinder, or to pass exhaust gas from one piston cylinder to a different piston cylinder, e.g., for piston cylinders having piston cycles where one piston is at a bottom of its work stroke with the other piston is at the bottom of its compression stroke.

EGR systems of this invention can be used with turbocharger engines, where suitable connection means is provided to direct exhaust gas from a piston cylinder exhaust gas port to an exhaust inlet of a turbocharger turbine housing.

Pulsed turbocharger systems of this invention are designed to operate on a pulsed, i.e., non-continuous, exhaust gas flow that is provided from an engine cylinder during a piston work stroke. The system comprises an internal combustion engine comprising a piston cylinder and a piston slidably disposed within the cylinder.

The engine cylinder includes an exhaust gas port that is disposed through a wall section of the cylinder. The exhaust gas port is positioned near a bottom portion of the cylinder such that: (1) an opening of the port is exposed when the piston is at the bottom of its stroke within the cylinder; and (2) an opening of the port is covered when the piston is moved towards the top of its stroke.

The system includes a turbocharger that is connected to the engine. The turbocharger comprises a turbine wheel that is in exhaust gas flow communication with the exhaust gas port. The system is designed so that pulsed exhaust gas exits the piston cylinder through the exhaust port, when the piston is near a bottom portion of its work stroke. This pulsed exhaust gas is directed to the turbine wheel to cause the turbocharger to produce boost air for directing to the engine.

DESCRIPTION OF THE DRAWINGS

The details and features of the present invention will be more clearly understood with respect to the detailed description and drawings in which.

DETAILED DESCRIPTION OF THE INVENTION

Figure 1A:
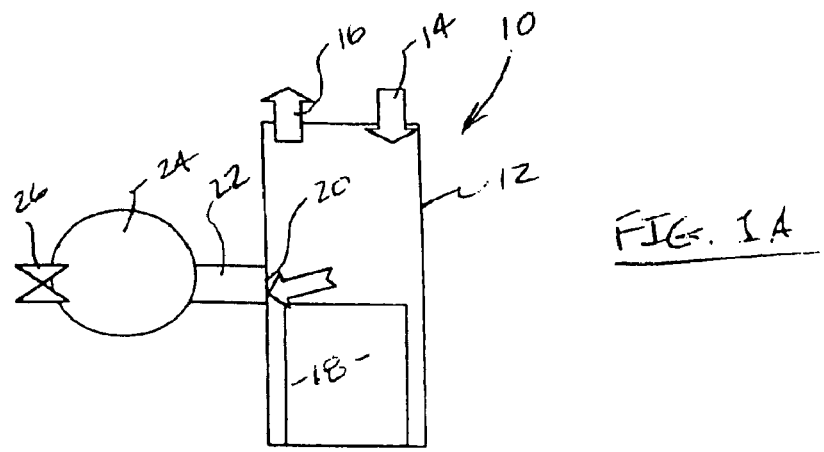
FIGS. 1A to 1D are schematic views of a first embodiment EGR system of this invention at different points of operation.

EGR systems of this invention are adapted to remove exhaust gas directly from an independent exhaust port within an engine piston cylinder for either subsequent storage in an EGR tank for later reintroduction into the piston cylinder at a later time, i.e., during the piston intake stroke, or for direct introduction into a different piston cylinder, i.e., a piston cylinder that is 360 degrees out of phase so that a piston within the cylinder is entering its intake stroke.

A first EGR system embodiment, prepared according to principles of this invention, is schematically illustrated in FIGS. 1A to 1D at different points or phases of operation. The first embodiment system 10 comprises an internal combustion engine piston cylinder 12 having at least one intake valve 14 and at least one exhaust valve 16 positioned adjacent a top portion of the cylinder, e.g., within a cylinder head. A piston 18 is positioned within the cylinder 12 and is attached to an engine crankshaft (not shown) to provide reciprocating axial up and down movement within the cylinder 12 in response to crankshaft rotation, as common with all conventional gasoline and diesel-powered internal combustion engines.

An exhaust gas port 20 is positioned near a bottom portion of the cylinder 12 and extends through a portion of the cylinder sidewall. The exhaust gas port 20 is independent of the exhaust valve 16 and exhaust manifold that is related thereto (not shown). The exhaust port 20 is positioned near a bottom portion of the piston cylinder 12 so that when the piston 18 is at a bottom dead center (BDC) position of its stroke at least a portion of the exhaust port opening is exposed to the open cylinder, i.e., the top surface of the piston resides at least a portion of the way below a portion of the exhaust port opening. Positioned in this manner, the exhaust port 20 is designed to receive a portion or by-pass stream of the combustion exhaust gas within the cylinder when the piston cycles through its BDC stroke position.

A conduit or duct 22 formed from suitable tubing, manifolding, and the like is connected to the exhaust port 20 to facilitate routing the by-pass exhaust gas from the cylinder 12 to an EGR tank 24. The EGR tank 24 can be attached to the engine or engine compartment and is adapted to retain a desired volume of the by-pass exhaust gas at a desired pressure. The EGR tank 24 can include a cooling means to cool the received by-pass exhaust gas a predetermined amount before being reintroduced back into the piston cylinder for combustion. In an exemplary embodiment, the EGR system comprises an independent EGR tank 24 for each piston cylinder. Accordingly, an EGR system of this invention adapted for use with an eight-cylinder engine comprises eight EGR tanks, each attached to an exhaust port of a respective piston cylinder.

The EGR tank 24 can include a valve 26 attached thereto that is used to adjust the amount of by-pass exhaust gas contained therein. The valve is actuated, opened or closed, by suitable control means to regulate the amount of by-pass exhaust gas that is reintroduced into the cylinder 12 according to engine operating conditions. Alternatively, rather than or in addition to using a valve on the EGR tank, the exhaust valve 16 timing of the engine can be adjusted to regulate the amount of by-pass exhaust that passes through the exhaust port, e.g., the exhaust valve timing can be adjusted so that the exhaust valve opens before the exhaust port is shut off by the piston to reduce exhaust gas pressure in the cylinder and related by-pass exhaust gas flow into the EGR tank.

The first embodiment EGR system 10 works as follows with reference to FIGS. 1A to 1D. FIG. 1A illustrates the EGR system 10 when the piston 18 is at BDC of its power stroke, when the piston cylinder 12 is full of combustion exhaust gas. When the piston 18 is moving downwardly in its labor stroke within the cylinder approaching BDC both valves 14 and 16 are closed, and the piston top surface begins to pass below and expose the exhaust port 20, thereby causing a portion of the exhaust gas within the cylinder 12 to pass through the exhaust port 20 and into the conduit 22. Configured in this manner, the downwardly moving piston acts to open the exhaust port. The exhaust gas flows under high pressure and velocity through the exhaust port 20 and conduit 22, and into the EGR tank 24.

Figure 1B:
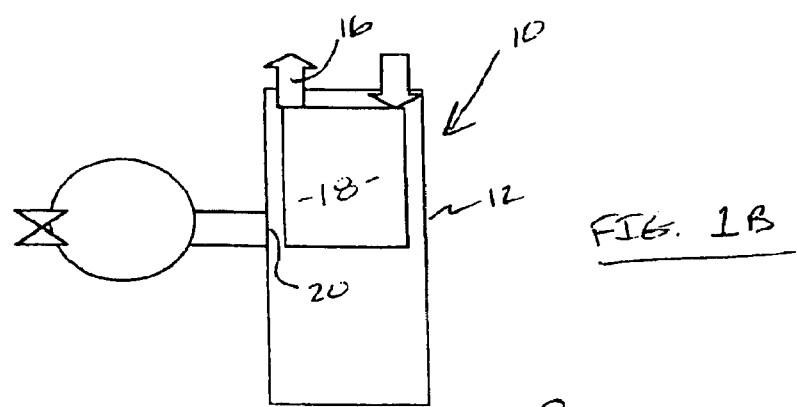

FIG. 1B illustrates the EGR system 10 at a point when the piston 18 is at the top of its exhaust stroke within the cylinder 12, acting to push the remaining exhaust gas out of the cylinder through the opened exhaust valve 16. When the piston 18 moves upwardly from its BDC position in FIG. 1A, the top surface of the piston closes off the opening to the exhaust port 20, both terminating exhaust gas flow into the EGR tank and preventing the EGR exhaust gas from reentering the cylinder. During this point of operation, the exhaust gas trapped in the ERG tank can be cooled by suitable cooling means before being reintroduced into the cylinder. Such exhaust gas cooling is desired to increase the density of the combustion air-fuel mixture within the cylinder combustion chamber, which is known to increase combustion energy.

Figure 1C:
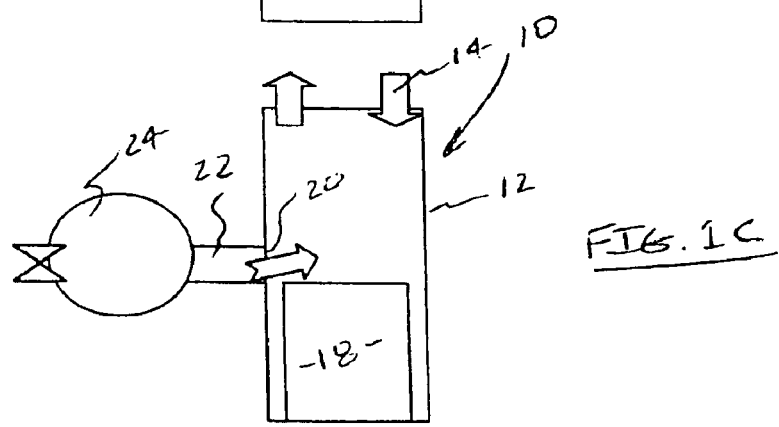

FIG. 1C illustrates the EGR system 10 at a point when the piston 18 is at the bottom of its intake stroke within the cylinder 12, acting to receive an air-fuel mixture therein via the intake valve 14. When the piston 18 moves downwardly from its position at the top of the cylinder in FIG. 1B, the top surface of the piston passes below the opening of the exhaust port 20 allowing exhaust gas contained within the conduit 22 and EGR tank 24 to be passed therefrom and be reintroduced into the cylinder 12.

At this stage of the piston operation, the in-cylinder pressure of the air-fuel mixture is less than that of the exhaust gas trapped within the EGR system so that the exhaust gas is rapidly reintroduced back into the cylinder once the exhaust port is exposed by the piston. In fact, the exhaust gas flow into the cylinder at this point is so powerful that estimated EGR amounts are expected to exceed 10 to 15 percent of the total gas mass in the cylinder at the moment that the compression stroke is started, i.e., at the moment that the piston begins to move upwardly within the cylinder after receiving the exhaust gas. During this point of operation, with the piston at the bottom of its travel within the cylinder, the exhaust and intake valves are preferably closed so that the reintroduced exhaust gas contributes to and mixes with the air-fuel mixture contained in the cylinder for subsequent combustion.

Figure 1D:
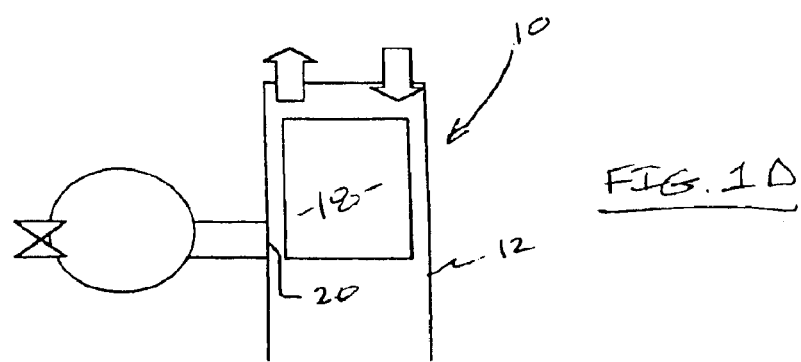

FIG. 1D illustrates the EGR system 10 at a point when the piston 18 is at top dead center (TDC) of its combustion stroke within the cylinder 12. As the piston 18 is moved upwardly within the cylinder 12 from its position at the bottom of the cylinder in FIG. 1C, the piston top surface moves upwardly and passes over to close the opening of the exhaust port 20, thereby terminating further reintroduction of exhaust gas into the cylinder. During this point of operation both the exhaust valve and intake valve are closed for combustion of the air-fuel and exhaust gas mixture contained within the cylinder.

Figure 2:
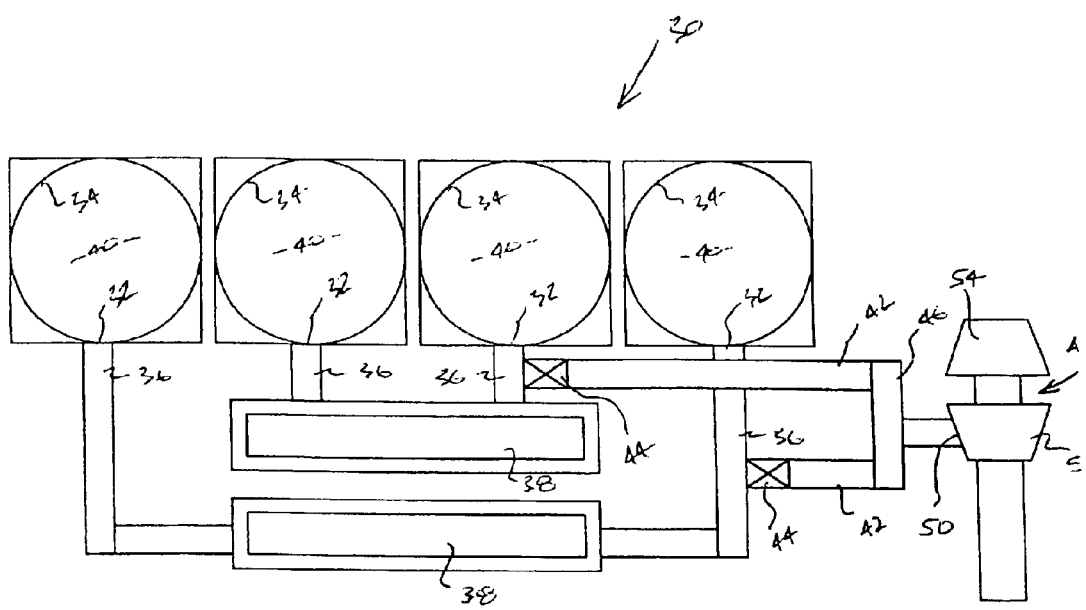
FIG. 2 is a schematic view of a second embodiment EGR system of this invention.

FIG. 2 illustrates a second embodiment EGR system 30 prepared according to principles of this invention. The second embodiment EGR system 30 includes an exhaust port 32 positioned within each piston cylinder 34 as discussed above and illustrated in FIGS. 1A to 1D. The exhaust port 32 in each piston cylinder 34 is adapted to receive exhaust gas from and introduce exhaust gas into a piston cylinder as discussed above. However, a primary difference between the two EGR system embodiments is that, unlike the first EGR embodiment, in the second embodiment EGR system the removed exhaust gas is not stored for later reintroduction into the same cylinder, but is transported to another different cylinder for immediate introduction therein.

A four cylinder engine has been illustrated in FIG. 2 for purposes of reference only and is not intended to be limiting with respect to the different types of engine applications second embodiment EGR systems of this invention can be used with. Exhaust gas conduits 36 are attached to and are in gas flow communication with respective exhaust ports 32 of each piston cylinder 34. Rather than being connected to individual EGR tanks, each conduit 36 is either routed directly to the exhaust port of a different cylinder, or is routed to an EGR tank 38 that is common to another conduit, exhaust port, and piston cylinder. The EGR tank 38 can include means for cooling down or reducing the temperature of the incoming exhaust gas for the reasons discussed above.

In an exemplary embodiment, the EGR system comprises at least two EGR tanks 38 that are each connected to more than one piston cylinder. The piston cylinders that are connected to a common EGR tank 38 are those that contain pistons having operating cycles that are opposed from one another by 360 degrees, e.g., that contain a piston in one cylinder that is at BDC (as illustrated in FIG. 1A) of its work stroke while a piston in another cylinder is at BDC of its compression stroke (as illustrated in FIG. 1C).

Looking at the four cylinder engine embodiment of FIG. 2, and numbering the engine cylinders 1 to 4 (moving from left to right across the figure), the pistons 40 in cylinder numbers 1 and 4 are configured on the engine crankshaft to move at the above-described opposed 360 degree stroke cycle with respect to one another. Similarly, the pistons 40 in cylinder numbers 2 and 3 are also configured on the engine crankshaft to move at the above-described opposed 360 degree stroke cycle with respect to one another. Exhaust gas conduits 36 leading from the exhaust ports 32 of cylinder numbers 1 and 4 are connected to a first common EGR tank 38, and exhaust gas conduits 36 leading from the exhaust ports 32 of cylinder numbers 2 and 3 are connected to a second common EGR tank 38.

Configured in this manner, exhaust gas exiting cylinder number 1 at its BDC position (as illustrated in FIG. 1A) passes through the exhaust port 32, into the respective conduit 36, and into the first common EGR tank 38. The exhaust gas entering the first common tank 38 is then passed, after cooling if desired, therethrough, through the gas conduit 36 and exhaust port 32 of cylinder number 4, where the exhaust gas enters the cylinder and is mixed together with the air-fuel mixture before combustion. The flow of exhaust gas reverses from cylinder number 4 to cylinder number 1 after the air-fuel exhaust gas mixture in cylinder number 1 is combusted. The same cycle of EGR exhaust gas passage between cylinders occurs with cylinders 2 and 3.

EGR system embodiments of this invention are intended to be used with internal combustion engines that are normally aspirated, supercharged, and turbocharged. Use of these EGR systems with turbocharged internal combustion engines is especially desirable to provide increased compression pressure within the piston cylinder at low turbocharger boost conditions, e.g., during low engine rpms. Accordingly, EGR systems of this invention are intended to be used in conjunction with turbochargers to both improve the low rpm performance of the engine, and improve $NO_x$ reduction.

FIG. 2 illustrates an EGR system 30 of this invention as used with a turbocharger 48. In such application, the EGR system is configured to route exhaust gas directly to an exhaust inlet 50 of a turbocharger turbine housing 52 comprising a turbine wheel (not shown) rotatably disposed therein. Exhaust gas conduits 42 extend from and are in gas flow communication with conduits 36 leading from cylinder numbers 3 and 4, i.e., cylinders that include pistons that do not operate at an opposed 360 degree stroke cycle.

Valves 44 are positioned at the connection point of each conduit 44 to regulate the amount of exhaust gas that is passed through the conduits and into a manifold 46 that is connected to a turbine 48. The manifold 46 is connected to the turbine housing exhaust inlet 50 so that exhaust gas passing therein it directed to the turbine wheel. The turbine wheel is connected by a common shaft to a compressor impeller (not shown) that is rotatably disposed within a compressor housing of the turbocharger. Thus, the exhaust gas directed to the turbine wheel from the EGR system operates to rotate the turbine wheel and drive the compressor impeller to provide pressurized intake air for routing to the engine induction system. The back pressure associated with operating such a turbocharger in conjunction with the EGR system is not believed to impact engine performance as it only sees this pressure near the bottom of the piston stroke which causes very little mechanical load in the rotational movement of the crankshaft.

Pulse only turbocharger systems of this invention are adapted to receive a pulsed stream of exhaust gas taken directly from one or more engine piston cylinders during a piston work stroke in each such cylinder. The pulsed exhaust gas stream is used to drive a turbine of a turbocharger, which actuates a compressor to provide boosted or pressurized intake air into one or more engine cylinders.

Figure 3:
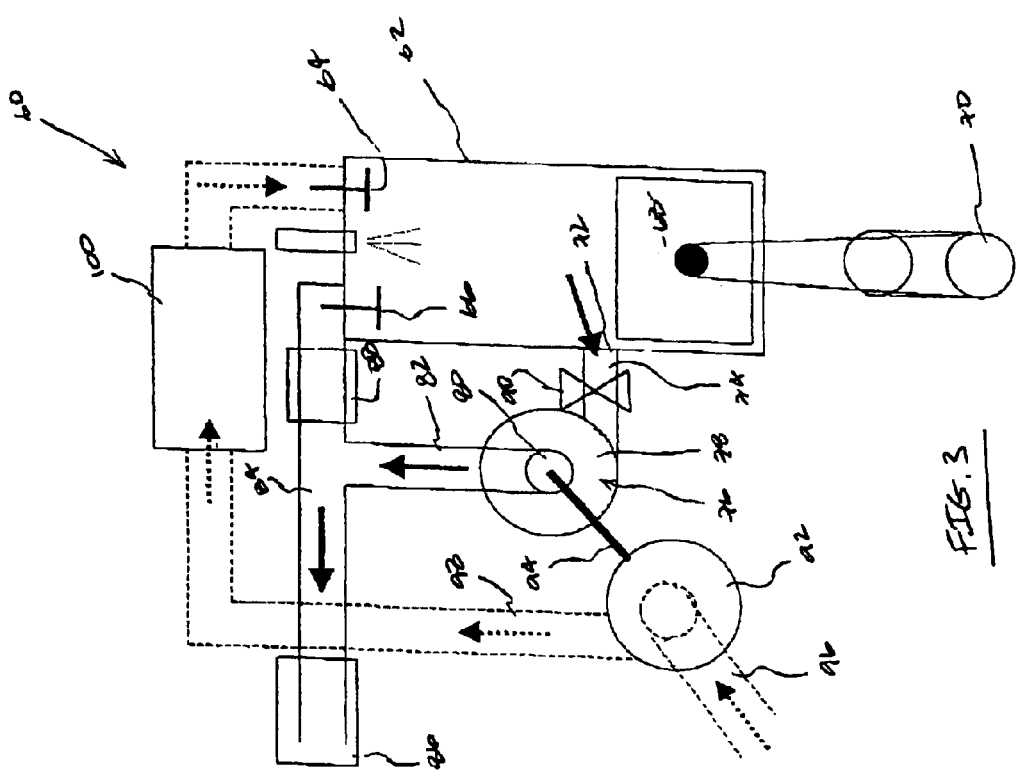
FIG. 3 is a schematic illustration of a pulse only turbocharger system constructed according to principals of this invention.

FIG. 3 illustrates a schematic view of a pulse only turbocharger system 60 of this invention. The system 60 comprises an internal combustion engine comprising a number of piston cylinders 62 each having at least one intake valve 64 and at least one exhaust valve 66 positioned adjacent a top portion of the cylinder, e.g., within a cylinder head. A piston 68 is positioned within the cylinder 62 and is attached to an engine crankshaft 70 to provide reciprocating axial up and down movement within the cylinder 62 in response to crankshaft rotation, as common with all conventional gasoline and diesel-powered internal combustion engines.

An exhaust gas port 72 is positioned near a bottom portion of the cylinder 62 and extends therethrough. The exhaust gas port 72 is independent of the exhaust valve 66 and is positioned near a bottom portion of the piston cylinder 62 so that when the piston is at the bottom dead center (BDC) of its work stroke at least a portion of the exhaust port 72 is exposed to the open cylinder, i.e., at BDC the top surface of the piston resides at least a portion of the way below an opening of the exhaust port. Positioned in this manner, the exhaust port 72 is designed to receive a portion or by-pass stream of the combustion exhaust gas within the cylinder when the piston cycles through the BDC portion of its work stroke.

A conduit or duct 74 formed from suitable tubing, manifolding and the like is attached to the exhaust port 72 to facilitate routing the by-pass exhaust gas from the cylinder 62 to a turbocharger 76 and, more specifically to an exhaust inlet of a turbocharger turbine housing 78. The turbocharger is attached by conventional means to the engine or engine compartment. Pulse only turbocharger systems of this invention can be configured having many turbochargers that are each matched to a respective piston cylinder, i.e., to each receive a pulsed exhaust gas stream from a single piston cylinder, or can be configured having one or more turbochargers that are matched to more than one piston cylinder, depending on the particular internal combustion engine design and application. An exemplary pulse only turbocharger system comprises a number of suitably sized turbochargers that equal the number of engine cylinders that are each in exhaust gas flow communication with a respective piston cylinder.

The turbine housing 78 includes a turbine exhaust outlet 30 that is connected to an exhaust outlet pipe 82. The exhaust outlet pipe 82 is connected to an exhaust manifold pipe 84 that receives exhaust gas from the cylinder 62 via the exhaust valve 66 during the normal operation of the engine. A catalytic converter 86 can be positioned within the engine exhaust system downstream of the turbocharger exhaust outlet pipe 82 to address engine exhaust emission requirements. The engine exhaust system can also include a small pre-catalytic converter 88 positioned within the exhaust manifold pipe 84 upstream of the turbocharger exhaust outlet pipe 82. It has been determined that catalyst light up can be dramatically improved, when compared to conventional turbocharger exhaust attachments, by placing a valve 90 within the conduit 74 to by-pass the turbocharger 76, thus causing all of the exhaust gas and related heat to pass from the cylinder via the exhaust valve 66 and through both catalysts 86 and 88. 25 The valve 90 can be operated by an engine control system and the like to close off the turbocharger exhaust gas inlet, e.g., when the vehicle is first started for a period of time until the catalytic converters are lit off and the desired engine exhaust emissions are achieved. Once the desired engine exhaust emissions are achieved, the valve 90 is opened to permit the flow of pulsed exhaust gas to the turbocharger 76. The size and specifications of the pre-catalytic converter 88 should be chosen so that the exhaust output characteristics are not significantly changed when the valve 90 can be opened and the amount of exhaust flow through the pre-catalytic converter 88 is reduced.

As true with conventional turbochargers, a turbocharger turbine disposed within the turbine housing 78 is connected to a turbocharger compressor disposed within a compressor housing 92 via a common shaft 94. Inlet air enters the compressor via an air inlet 96, is pressurized a desired amount, and exits the compressor via an air outlet 98. The amount by which the air within the air outlet 98 is pressurized or boosted depends on the operating conditions of the engine. The pressurized air leaving the turbocharger is routed through the air outlet 98 into a cooler 100, e.g., an intercooler, where the temperature of the air is reduced before being introduced into the piston cylinder 62 via the intake valve 64 for combustion with an air-fuel mixture.

The above-described pulse only turbocharger system of this invention is driven by pulse only exhaust gas pressure and heat to provide a positive pressure difference across the cylinder as follows. As the piston 68 travels downwardly during its work stroke (after combustion) the piston top surface passes below an opening of the exhaust port 72, allowing a portion of the combustion exhaust gas to enter the conduit 74 and drive the turbocharger turbine. As the piston 68 moves upwardly during its exhaust stroke, after hitting its BDC position, the piston top surface moves to cover the exhaust port opening 72, thus preventing further exhaust gas flow to the turbocharger. As the piston continues its upward exhaust stroke movement, the exhaust valve 66 opens and the exhaust gas remaining within the cylinder is evacuated therefrom and is passed through the engine manifold pipe 84. As the piston moves upwardly in this fashion, the turbocharger compressor 92 operates to pressurize inlet air for passing to the piston cylinder via the compressor air outlet 98 and cooler 100.

As the piston begins its downward intake stroke within the cylinder, the intake valve 64 opens and the boosted air and, in gasoline engines, fuel for a combustible air-fuel mixture, is introduced into the cylinder. As the piston reaches the bottom of its intake stroke the opening of the exhaust port 72 is again exposed. However, during this intake stroke there does not exist the same pressure differential that existed during the work stroke and there is no appreciable flow of the combustion mixture into the exhaust port 72. As the piston 68 returns upward during its compression stroke, toward its top dead center (TDC) position, the intake valve 64 is closed, fuel is injected in direct injection or diesel engines, and the combustion mixture is ignited, propelling the piston downward within the cylinder into its work stroke. Each time the piston reaches its BDC position during the work stroke a portion of the combustion exhaust gas is vented through the exhaust port to the turbocharger.

The turbocharger system of this invention is referred to as being "pulsed" or operating under "pulsed pressure" because, unlike conventional turbocharger systems that are driven by a substantially uninterrupted flow of exhaust gas, turbocharger systems of this invention are driven by a pulse of exhaust gas provided only when the piston passes through the BDC of its work stroke.

Advantages of pulse only turbocharger systems of this invention when compared to convention turbocharger systems, i.e., those driven by an uninterrupted exhaust gas stream, is that: (1) it places a minimal load/stress on the engine because any backpressure associated with the turbocharger is provided at the base of the cylinder and along the base or side of the piston, thereby minimizing the load pressures transmitted to the engine crankshaft; and (2) it does not impose a high exhaust backpressure on the engine, which can rob the engine of pumping energy.

Having now described the invention in detail as required by the patent statutes, those skilled in the art will recognize modifications and substitutions to the specific embodiments disclosed herein. Such modifications are within the scope and intent of the present invention.

Having now described the invention in detail as required by the patent statutes, those skilled in the art will recognize modifications and substitutions to the specific embodiments disclosed herein. Such modifications are within the scope and intent of the present invention.

What is claimed is:

1. An internal combustion engine system:
   an internal combustion engine comprising a number of piston cylinders, a piston slidably disposed within each cylinder, each cylinder comprising an exhaust gas port disposed therethrough positioned near a bottom portion of the cylinder so that the port is exposed when the piston is at the bottom of its stroke within the cylinder, and that is covered when the piston moves upwardly in the cylinder towards the top of its stroke; and
   means for receiving a volume of exhaust gas routed from the piston cylinder exhaust gas port of one piston cylinder when the piston within the cylinder is at the bottom of a work stroke, and directing the same volume of receiving gas to the exhaust gas port or another piston cylinder having its piston at the bottom of its compression stroke.

2. The system as recited in claim 1 comprising a number of means for receiving that are each in exhaust gas flow communication with the exhaust gas port of a respective piston cylinder.

3. The system as recited in claim 1 wherein the means for receiving comprises a tank that is external from the engine.

4. The system as recited in claim 1 further comprising a turbocharger connected to the engine, the turbocharger including a turbine housing with an exhaust gas inlet that is in exhaust gas flow communication with one or more piston cylinder exhaust gas ports.

5. An internal combustion engine system comprising:
   an internal combustion engine comprising a number of piston cylinders;
   a piston slidably disposed within each cylinder;
   at least one exhaust valve and one intake valve positioned adjacent an end of each cylinder;
   an exhaust gas port disposed through each piston cylinder positioned near a bottom portion of the cylinder so that the port is exposed when the piston is at the bottom of its stroke within the cylinder, and is covered when the piston is moved towards the top of its stroke; and
   means for receiving a volume of exhaust gas from the exhaust gas port of at least one cylinder, and transferring the same volume of exhaust gas without adding air through an exhaust gas port of at least one other cylinder for combustion;
   wherein exhaust gas passes through the exhaust port of each piston cylinder when the respective piston is at the bottom of its work stroke and is passed through the exhaust port of a different piston cylinder comprising a piston that is at the bottom of its compression stroke.

6. The system as recited in claim 5 wherein the means for receiving and transferring is external from the engine.

7. The system as recited in claim 5 further comprising a turbocharger connected to the engine, the turbocharger including a turbine housing with an exhaust gas inlet that is in exhaust gas flow communication with one or more piston cylinder exhaust gas ports.

8. An internal combustion system comprising:
   an internal combustion engine comprising a number of piston cylinders and pistons slidably disposed therein, each cylinder including an exhaust gas port disposed through a wall section of the cylinder and positioned near a bottom portion of the cylinder so that an opening of the port is exposed when the piston is at the bottom of its stroke within the cylinder, and the opening of the port is covered when the piston is moved towards the top of its stroke;
   means for receiving exhaust gas from the exhaust gas port of one cylinder and transferring the receive exhaust gas to the exhaust gas port of another cylinder for combustion; and
   a turbocharger connected to the engine and comprising a turbine wheel in exhaust gas flow communication with one or more of the exhaust gas ports to cause the turbocharger to produce boost air for directing to the engine.

9. The system as recited in claim 8 further comprising a valve interposed between the turbine wheel and the exhaust gas port to control the amount of exhaust gas directed to the turbine wheel.

10. An internal combustion engine system comprising:
    an internal combustion engine comprising a piston cylinder and a piston slidably disposed within each cylinder, the cylinder including an exhaust gas port disposed through a wall section of the cylinder and positioned near a bottom portion of the cylinder so that an opening of the port is exposed when the piston is at the bottom of its stroke within the cylinder, and an opening of the port is covered when the piston is moved towards a top of its stroke; and
    a turbocharger connected to the engine comprising turbine wheel in exhaust gas flow communication with the exhaust gas port;
    wherein pulsed exhaust gas exits the piston cylinder through the exhaust port, when the piston is near a bottom portion of its work stroke, and is directed to the turbine wheel to cause the turbocharger to produce boost air for directing to the engine; and
    wherein the internal combustion engine comprises a number of piston cylinders each having the exhaust gas port, and a number of turbochargers each having a turbine wheel in gas flow communication with a respective exhaust gas port.

11. An internal combustion engine system comprising:
    an internal combustion engine comprising a piston cylinder and a piston slidably disposed within each cylinder, the cylinder including an exhaust gas port disposed through a wall section of the cylinder and positioned near a bottom portion of the cylinder so that an opening of the port is exposed when the piston is at the bottom of its stroke within the cylinder, and an opening of the port is covered when the piston is moved towards a top of its stroke; and a turbocharger connected to the engine comprising turbine wheel in exhaust gas flow communication with the exhaust gas port;

wherein pulsed exhaust gas exits the piston cylinder through the exhaust port, when the piston is near a bottom portion of its work stroke, and is directed to the turbine wheel to cause the turbocharger to produce boost air for directing to the engine;

wherein the turbine wheel only receives exhaust gas from the exhaust gas port.

12. A pulsed turbocharger system: an internal combustion engine comprises a number of piston cylinders;

a piston slidably disposed within each cylinder;

at least one exhaust valve and one intake valve positioned adjacent an end of each cylinder;

an exhaust gas port disposed through each piston cylinder positioned near a bottom portion of the cylinder so that an opening of the port is exposed when the piston is at a bottom of its stroke within the cylinder, and an opening of the port is covered when the piston is moved towards a top of its stroke, wherein the exhaust port of one cylinder is connected to the exhaust port of another cylinder to facilitate exhaust gas transfer therebetween;

a turbocharger connected to the engine comprising:

a turbine housing having an exhaust inlet in gas flow communication with the exhaust gas port, an exhaust outlet in gas flow communication with an exhaust flow from the engine, and a turbine wheel rotatably disposed therein; and a compressor housing having an air inlet, a pressurized air outlet, and a compressor impeller rotatably disposed therein and connected with the turbine wheel, wherein the pressurized air outlet is in air flow communication with the engine intake valve;

wherein pulsed exhaust gas is directed to the turbine wheel when the piston is near a bottom portion of its work stroke in the cylinder, to cause the compressor impeller to produce boost air that is directed to piston cylinder during its intake stroke.

13. An internal combustion engine system:

an internal combustion engine comprising a number of piston cylinders, a piston slidably disposed within each cylinder, each cylinder comprising an exhaust gas port disposed therethrough positioned near a bottom portion of the cylinder so that the port is exposed when the piston is at the bottom of its stroke within the cylinder, and that is covered when the piston moves upwardly in the cylinder towards the top of its stroke;

means for accommodating a volume of exhaust gas routed from the piston cylinder exhaust gas port when the piston within the cylinder is at the bottom of a work stroke for reintroduction back through the exhaust gas port and into the cylinder when the piston is at the bottom of its compression stroke; and a turbocharger connected to the engine and comprising a turbine wheel in exhaust gas flow communication with the exhaust gas port wherein pulsed exhaust gas exits the piston cylinder through the exhaust port, when the piston is near a bottom portion of its work stroke, and is directed to the turbine wheel to cause the turbocharger to produce boost air for directing to the engine.

* * * * *